March 4, 1969  C. M. SENN ET AL  3,430,786
CHANGING BENCH FOR FLASH WELDER DIES AND THE LIKE
Filed Oct. 21, 1966  Sheet 1 of 2

INVENTOR
Charles M. Senn &
Owen S. Cecil, Jr.

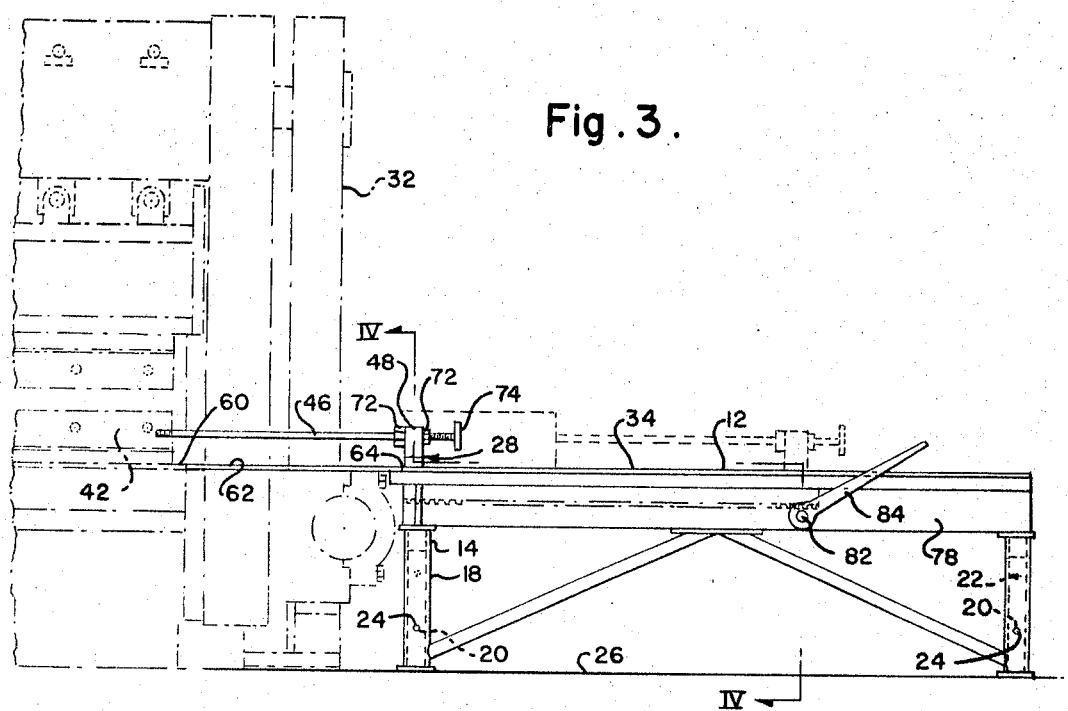
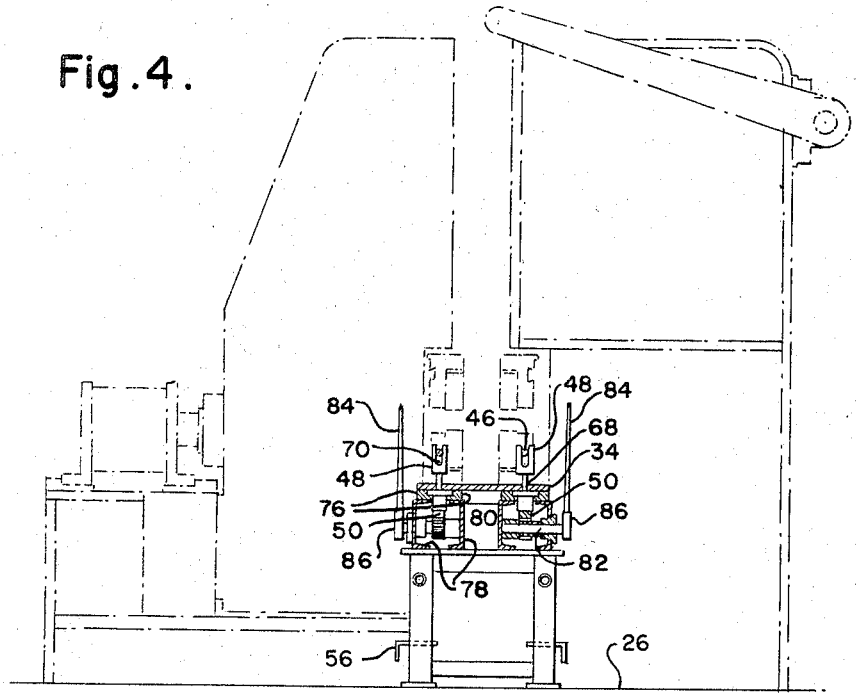

United States Patent Office 3,430,786
Patented Mar. 4, 1969

3,430,786
CHANGING BENCH FOR FLASH WELDER DIES AND THE LIKE
Charles M. Senn and Owen S. Cecil, Jr., Pittsburgh, Pa., assignors to Mesta Machine Company, Pittsburgh, Pa., a corporation of Pennsylvania
Filed Oct. 21, 1966, Ser. No. 588,482
U.S. Cl. 214—16.4    5 Claims
Int. Cl. B66f 9/14

ABSTRACT OF THE DISCLOSURE

A changing bench for inserting and withdrawing elongated elements supportable on a structure having guideways therefor, said changing bench including platform means, means for mounting said platform means in alignment with said guideways, traction means movably mounted on said platform means, and guiding means coupled to said traction means along a path alignable with said guideways so that the application of bending moments to said machine elements is avoided by said traction means.

---

The present invention relates to apparatus for manipulating heavy machine elements and other objects along guideways therefore and more particularly to apparatus of the character described for withdrawing and inserting elongated objects of the character described, such as the elongated die or die block assemblies frequently used in strip welding equipment or the like.

Although the invention is described primarily in connection with changing or substituting the die or die holder assemblies of a flash strip welder, such as the strip welder described and claimed in our copending, coassigned application entitled Flash Strip Welder, Ser. No. 588,485, filed Oct. 21, 1966, it will be understood as this description proceeds that our invention is of general utility in manipulating relatively heavy objects, particularly those which are elongated and are slidably mounted as components in various items of equipment.

In the operation of equipment utilizing slidably mounted elements or members, it is frequently necessary to remove the members for refinishing or resurfacing or other maintenance. Because of the weight or frictional engagement involved it is difficult, if not impossible in many cases, to remove the members by hand. With available types of traction equipment, it is virtually impossible to withdraw the slidably mounted members precisely in the direction of their sliding movement, without imparting bending moments thereto, in order to remove the members from the associated equipment without scratching or gouging or otherwise damaging the members or the equipment. The same holds true when the refinished or repaired members, or similar substitute replacement parts are reinserted into the equipment.

These considerations apply particularly to butt-welding equipment such as strip joining welders wherein the removable die or die block assemblies are of considerable length and weight and require careful handling during withdrawal and reinsertion operations. In the usual case the die or die holders are arranged for sliding movement to their operating positions within the welding apparatus whereat the die or die holders are releasably clamped. Therefore when it is desired to replace the die assemblies the latter are unclamped and thereafter must be slidably withdrawn from the welding apparatus without damage to the clamping means or to the slideways provided for this purpose or to the die assemblies themselves. For these reasons it is necessary that the die assemblies be withdrawn and inserted into the welding equipment in a controlled manner without imparting bending moments to the die assemblies when making such withdrawals or insertions.

We have overcome these difficulties by providing a changing bench having traction means associated therewith for slidably withdrawing and inserting such slidably mounted machine elements, including the aforementioned welding die assemblies. In a presently preferred form of our invention we provide a changing bench arranged for use with welding equipment having a number of spaced, generally parallel welding die assemblies, said bench having means for generally aligning said bench with said die assemblies respectively, and traction means slidably mounted on the bench and detachably engageable with said die assemblies for withdrawing and inserting said assemblies at the aligned positions of the bench.

In other arrangements of our invention, alternate bridging members are provided for spacing and aligning said changing bench relative to the welding equipment and to the die assemblies therein contained. In another arrangement of our invention the aforementioned slidably mounted traction means are arranged to engage at least two such die assemblies with which the changing bench is alignable for concurrrently withdrawing and inserting such assemblies when desired. In any event, the aforementioned traction means are mounted for movements in a direction parallel to the direction of the sliding, insertion and withdrawal movements of the die assemblies so that the die assemblies can be inserted and withdrawn without imparting bending moments thereto.

In the foregoing paragraphs certain objects, features and advantages of our invention have been set forth. These and other features, objects and advantages will be elaborated upon during the forthcoming description of certain presently preferred embodiments of our invention together with preferred methods of practicing the same.

In the accompanying drawings we have shown certain presently preferred embodiments of the invention and have illustrated certain presently preferred methods of practicing the same, wherein:

FIGURE 1 is a side elevational view, partially in section, of one form of changing bench arranged in accordance with the invention and adapted for purposes of illustration for inserting and withdrawing the die assemblies of a strip welding apparatus or the like;

Figure 1:
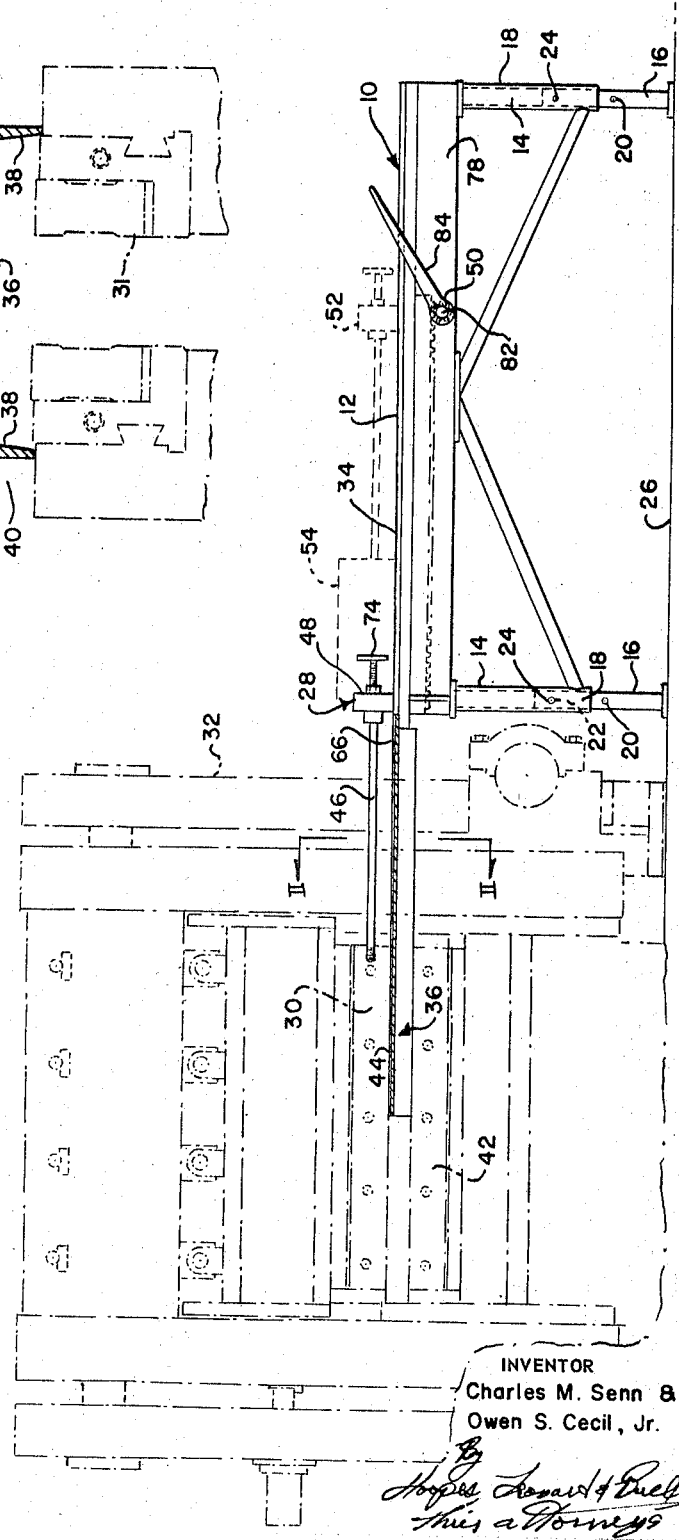

FIGURE 3 is another elevational view of the apparatus as shown in FIGURE 1 but illustrating an alternative position of the aligning and spacing means associated with the changing bench for aligning the bench relative to the insertion and withdrawal paths of the die assemblies or the like; and FIGURE 4 is a cross-sectional view of the apparatus as shown in FIGURE 3 and taken along reference line IV—IV thereof.

Figure 2:
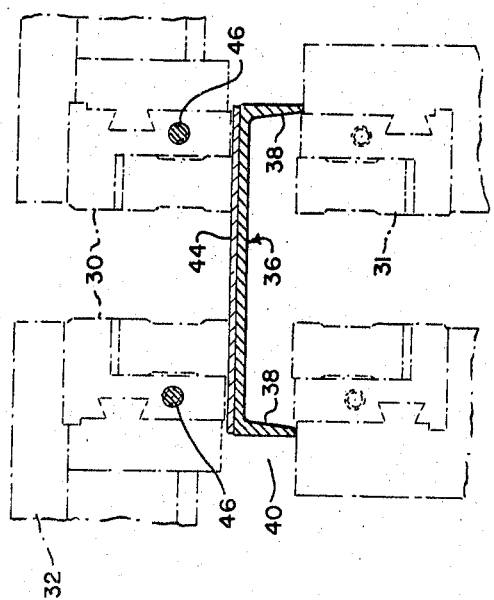
FIGURE 2 is an enlarged, partial, cross-sectional view of the apparatus shown in FIGURE 1 and taken along reference line II—II thereof.

Referring now to FIGURES 1 and 2 of the drawings, a changing bench 10 arranged according to our invention includes a table structure denoted generally by reference character 12 and having adjustable legs 14, for example of telescoping construction, which are here shown in their extended positions. In this arrangement, each of the legs 14 includes interfitting tubular members 16 and 18 respectively, with the inner tubular member 16 being provided by way of example with a pair of spaced apertures 20 and 22. The upper aperture 22 of each inner tubular member 16 is aligned in the extended positions of the legs 14 with a similar aperture 24 formed in the associated outer tubular member 18 of each leg 14. An L-shaped pin or the like, such as described below with reference to FIGURE 4, can be inserted through the aligned apertures 22, 24 to secure the legs 14 in their extended positions, as shown in FIGURE 1.

When thus extended and secured, the legs 14 determine the height of the table 12 above the floor elevation 26 so that traction means 28 mounted on the table 12 can be aligned in this example with upper die assembly or assemblies 30 of associated welding equipment 32 or the like.

When the table top, which is formed in this example by plate 34, is thus disposed at the proper elevational alignment with the upper die assemblies 30, a bridging member 36 is inserted between the adjacent end of the table plate 34 and the welding equipment 32 in order to provide in cooperation with the table plate 34 a continuous surface or platform for withdrawal of the die assemblies 30 onto the changing bench 10. The bridging member 36 also serves to space the table structure 12 a proper distance from the adjacent ends of the die assemblies to permit proper operation of the traction means 28. The bridging member 36 also facilitates longitudinal alignment of the changing bench 10 with the die assemblies 30. In this example of the invention the bridging member 36 as better shown in FIGURE 2 is formed from a relatively wide channel member, the leg portions 38 of which extend across the gap 40 between the upper die assemblies 30 and the lower die assemblies 42. A suitable covering or mat 44 (FIGURE 2) of relatively softer material is laid over the channel member and plate 34 to prevent damage to the die assemblies during handling.

In this arrangement the traction means 28 includes a pair of traction rods 46 (FIGURE 2) the outer threaded ends of which are threadedly secured respectively in tapped apertures formed in the adjacent ends of the die assemblies 30, as shown in FIGURES 1 and 2. After loosening the die clamping means usually associated with the welding equipment 32, the traction means 28 are actuated to withdraw the upper die assemblies 30 from the welding equipment. In this arrangement of the invention the traction means 28, as described in additional detail hereinafter with reference to FIGURE 4, includes a pair of traction rod holders 48 which are slidably mounted upon the table 12 for movement longitudinally thereof by means of drive members such as elongated racks 50 also slidably mounted on the table 12. In this arrangement of the invention separate driving means including the associated one of the racks 50 are provided for each of the rod holders 48.

When the traction rods 46 are thus secured to the upper die assemblies 30, the latter are withdrawn, in the example shown, by the traction means 28 which moves both the rods 46 and their holders 48 to their dashed outline positions denoted generally by reference character 52 of FIGURE 1. This operation withdraws the upper die assemblies 30 to the positions denoted generally by dashed outline 54. At this point of complete withdrawal from the welder 32, the die assemblies 30 can be unthreaded from the traction rods 46 and suitable eye bolts (not shown) substituted therefore to enable the die assemblies to be picked up by a crane or the like.

Following removal of the upper die assemblies 30, the legs 14 of the table structure 12 are then retracted which lowers the table plate 34 to a position of elevational alignment with the lower die assemblies 42 of the welding apparatus 32, as shown in FIGURES 3 and 4. In this position the member aperture 24 of the outer tubular section 18 of each table leg 14 coincides with the lower inner tubular member aperture 20 as shown in FIGURE 3 of the drawings. In this position as shown in FIGURE 4 of the drawings, pin 56 is inserted into the coinciding apertures 20, 24 of each leg 14 in order to secure the table 12 at its lowered position.

When thus positioned the gap between the ends of the slideways 60 of the welding apparatus 32 and the adjacent end of the table plate 34 is bridged by a bridging plate 62. Desirably the table plate 34 terminates short of the adjacent end of the table structure 12 as denoted by reference character 64 in order to provide a ledge upon which the adjacent end of the bridging plate 62 rests. The other end of the bridging plate 62 similarly rests on a ledge provided for this purpose adjacent the end of the slideways 60. The bridging member 36, described previously with reference to FIGURES 1 and 2, similarly rests on the adjacent end of the table structure 12 by means of its extension tab 66. Thus, a substantially continuous surface is provided by the table plate 34 and the associated bridging member 36 or 62 at either elevation of the table structure. The adjacent end of the bridging plate 62 or the extension tab 66 of the bridging member 36 in addition serves to delimit the longitudinal movement of the rod holders 48 which are mounted respectively in longitudinally extending slots 68 formed in the table plate 34 (FIGURE 4) and opening at the adjacent front edge thereof.

As better shown in FIG. 4 of the drawings, in order to facilitate removal of the traction rod 46 from the die assemblies 40, 42 and from the traction means 28, the upward extremities of the rod holders 48 are bifurcated in order to provide top opening, rod-receiving slots 70 therein. The adjacent end portions of the rods 46 are threaded so that the rods can be releasably clamped in their slotted holders 48 by means of clamp nuts 72. When the nuts 72 are released the traction rod 46 can be threaded or unthreaded from the associated die assemblies by rotating the rod 46 by means of handle or hand wheel 74. The slots 70 of the rod holders 48 also permit limited angular displacement of the rods 46 for further alignment, if necessary, with the tapped apertures formed in the die assemblies 30 and 42 as the rods 46 are being threaded therein.

Each of the rod holders 48 is secured to an elongated rack 50 which is also slidably mounted on the underside of the table plate 34. This can be accomplished, for example, by means of a spaced pair of longitudinally extending angle brackets 76 for each of the racks 50. In this arrangement the angle brackets 76 are mounted by sandwiching between a like number of channel members 78 and the table plate 34, with the channel members 78 each extending substantially the full length of the table structure 12 in order to provide the necessary structural rigidity and support for the table plate 34.

In order to slide each of the racks along the undersurface of the table plate 34 and the slideway defined by the associated pair of brackets 76, a pinion 80 is enmeshed with rack 50 and is mounted on a transversely extending shaft 82 for rotation therewith. The shaft is rotatably mounted in the associated pair of the channel members 78, as better shown in FIGURE 4. Each of the shafts 82 protrudes from the associated outer channel member 78 for connection to an operating handle 84. Preferably each operating handle 84 is connected to its associated pinion shaft 82 through a reversible rachet mechanism 86 of known construction so that each handle can be operated through a convenient arc by personnel attending the changing bench in order to effect movement of the associated rack 50 in either direction for insertion or withdrawal of the die assemblies 30, 42.

From the foregoing it will be apparent that novel and efficient forms of changing benches have been disclosed herein for handling slidably mounted, elongated die assemblies and other machine elements or objects without the application of undesirable bending moments thereto.

While we have shown and described certain presently preferred embodiments of the invention and have illustrated certain presently preferred methods of practicing the same, it is to be distinctly understood that the invention is not limited thereto but may be otherwise variously embodied and practiced within the scope of the following claims.

We claim:
1. A changing bench for handling elongated members supportable on a structure having elongated spaced guide- ways therefor, said changing bench comprising platform means, means for moving said platform means into alignment with a selected number of said guideways to facilitate the removal or insertion of the associated number of said elongated members from or onto said guideways, traction means mounted on said platform means for movement in directions toward and away from said guideways when said platform is so aligned to transfer said elongated members to or from said guideways, means for movably mounting said traction means, said traction means including holding means for attaching said traction means to said elongated members, guiding means for said holding means, means detachably supported at one of its ends to said platform means and at its other end to said structure to prevent the application of bending moments to said elongated members during insertion and removal thereof, said last-mentioned means being disposed to delimit a path of movement of said traction means in one of said directions when said traction means is located on said platform means, said last-mentioned means being mountable in substantially co-planar relation to said guideways.

2. The combination according to claim 1 wherein said platform moving means are capable of moving said platform into co-planar alignment with said guideways, and said last-mentioned means are capable additionally of being mounted in substantially co-planar relation to said platform.

3. The combination according to claim 1 wherein said holding means are provided with elongated means having means adjacent one end thereof for attaching said elongated means to said elongated members.

4. The combination according to claim 3 wherein means are provided for releasably mounting said elongated means in said holding means.

5. The combination according to claim 4 wherein said platform moving means are capable of moving said platform into co-planar alignment with said guideways, said last-mentioned means are capable additionally of being mounted in substantially co-planar relation to said platform.

References Cited

UNITED STATES PATENTS

| | | |
|---|---|---|
| 1,830,740 | 11/1931 | Leech et al. |
| 1,883,538 | 10/1932 | Bywater _____ 214—516 |
| 2,132,612 | 10/1938 | Faries _____ 214—516 |
| 2,352,129 | 6/1944 | Shonnard _____ 214—516 |
| 2,691,450 | 10/1954 | Rosenbaum. |
| 2,954,882 | 10/1960 | Dailey _____ 214—16.4 |
| 2,987,205 | 6/1961 | Draxler _____ 214—730 |
| 3,150,787 | 9/1964 | Patrignani. |
| 3,357,582 | 12/1967 | Witter _____ 214—512 |

GERALD M. FORLENZA, Primary Examiner.

R. B. JOHNSON, Assistant Examiner.

U.S. Cl. X.R.

214—730

UNITED STATES PATENT OFFICE
CERTIFICATE OF CORRECTION

Patent No. 3,430,786 March 4, 1969

Charles M. Senn et al.

It is certified that error appears in the above identified patent and that said Letters Patent are hereby corrected as shown below:

Column 1, line 19, after "means" insert -- and to said platform means for guiding said traction means --.

Signed and sealed this 31st day of March 1970.

(SEAL)
Attest:

Edward M. Fletcher, Jr.

Attesting Officer

WILLIAM E. SCHUYLER, JR.

Commissioner of Patents